A. E. ROLF.
AUTO HUB ATTACHMENT.
APPLICATION FILED MAY 25, 1920.
1,361,496.
Patented Dec. 7, 1920.
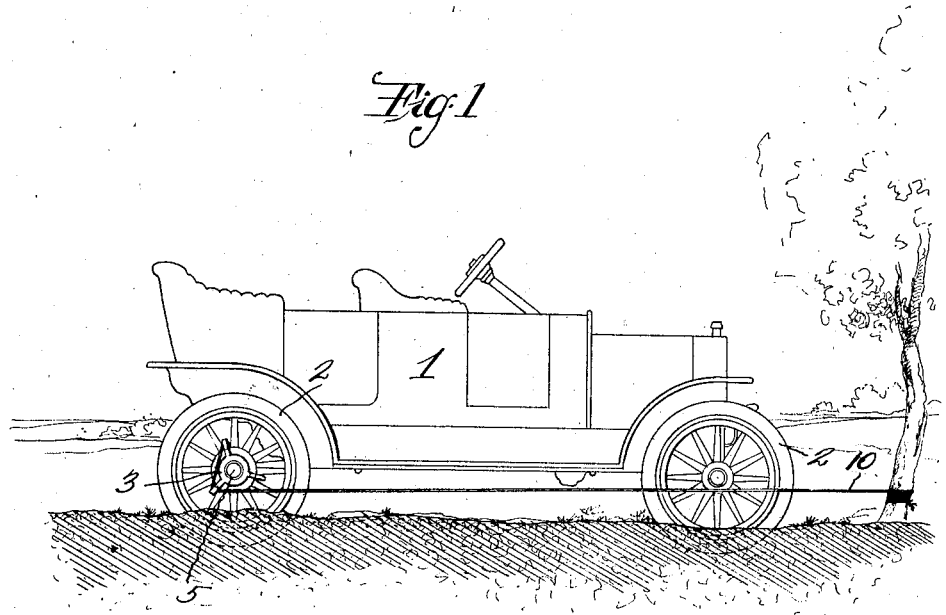
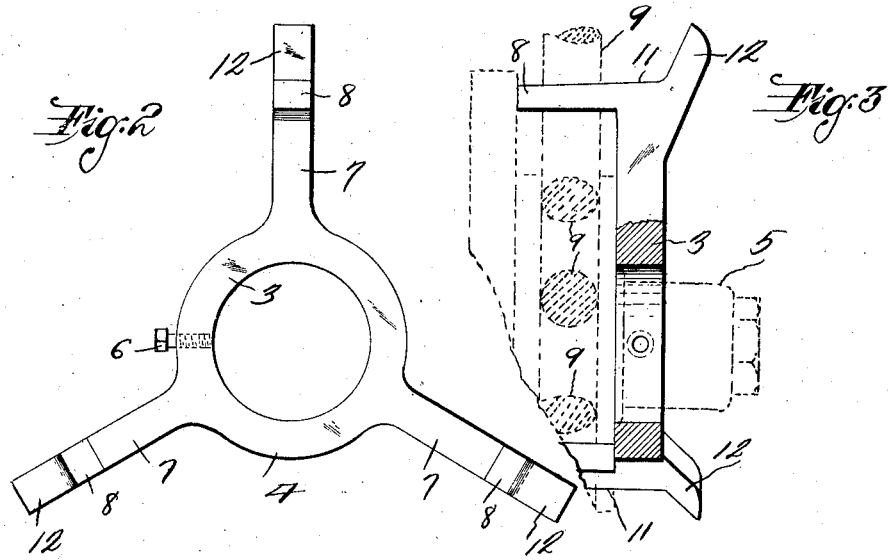

UNITED STATES PATENT OFFICE.

AARON E. ROLF, OF BLAISDELL, NORTH DAKOTA.

AUTO-HUB ATTACHMENT.

1,361,496.  Specification of Letters Patent.  Patented Dec. 7, 1920.

Application filed May 25, 1920. Serial No. 384,024.

*To all whom it may concern:*

Be it known that I, AARON E. ROLF, a citizen of the United States, residing at Blaisdell, in the county of Mountrail, State of North Dakota, have invented a new and useful Auto-Hub Attachment; and I do hereby declare the following to be a full, clear, and exact description of the invention, such as will enable others skilled in the art to which it appertains to make and use the same.

The invention relates to auto hub attachments and has for its object to provide an attachment which may be quickly and easily attached to the hub of a wheel and provided with arms adapted to be disposed between spokes of the wheel, thereby providing means for holding and bracing the wheel if the wheel should become broken or the hub cracked so that the vehicle may be driven to a garage and repaired.

A further object is to provide outwardly and radially extending lugs carried by the hub attaching member so that said hub, may be utilized for pulling the vehicle out of the mire by means of a cable.

A further object is to provide a wheel attachment comprising a circular member adapted to telescopically engage the wheel hub, said circular member being provided with a set screw whereby the same may be securely fastened to the hub, said circular member being provided with radially disposed arms, the outer ends of which are provided with arms angularly disposed so as to be received between the spokes of the wheel. Also to provide the outer ends of the radially disposed arms with outwardly and radially disposed lugs whereby the hub device may be used for pulling the automobile out of the mire.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of an automobile showing the hub attaching device attached thereto and in position assumed when the same is used for pulling the automobile out of the mire.

Fig. 2 is an enlarged rear view of the hub attaching device.

Fig. 3 is a detail sectional view through a portion of the device showing the same in position on a wheel hub.

Referring to the drawings, the numeral 1 designates a conventional form of motor driven vehicle and 2 the wheels thereof. When a wheel becomes broken, or when the hub casting becomes broken it is necessary to drive the machine to a garage or repair shop, therefore to brace the spoke and hold together the wheel or casting until it reaches a garage or repair shop a hub engaging device 3 is provided. The hub engaging device 3 comprises the annular ring 4, which ring is adapted to engage over the hub 5 and be held securely thereon by means of the set screw 6. Integrally joined and extending radially from the annular ring 4 are arms 7, the outer ends of which are provided with inwardly extending right angled arms 8, which arms are adapted to be disposed between the spokes 9 of the disabled wheel, with the sides of the lugs in engagement with the adjacent faces of the spokes and brace the wheel and its spokes so that the vehicle may be driven to a repair shop. The hub engaging device 3 may also be used in connection with a cable 10 for pulling an automobile out of the mire. To accomplish this the cable 10 is attached to a tree or a stake and has its other end passed around the outer surfaces 11 of the arms 7 and arms 8, there being outwardly and radially extending lugs 12 for holding the cable on the device as the wheel is revolved and the cable wound on the device.

From the above it will be seen that a repair hub is provided which may be easily and quickly applied to a disabled wheel and it will also be seen that the hub may be used in connection with a cable for pulling an automobile out of the mire.

By forming the device from a single casting, it will be seen that it may be cheaply made and that the device is practically in one piece and only requires the manipulation of one bolt for securing the same in place.

The invention having been set forth what is claimed as new and useful is:

A repair hub for automobiles, said hub comprising an annular ring adapted to engage over a wheel hub, means for securing said annular ring on the wheel hub, radially disposed arms carried by the annular ring, right angled arms extending inwardly from the radially disposed arms at their ends and to one side of the annular ring, and adapted to be disposed between the spokes of a wheel and outwardly and radially extending lugs carried by the ends of the radially disposed arms for preventing displacement of a cable as the same is wound upon the ends of the radially disposed arms and the outer surfaces of the right angled arms.

In testimony whereof I have signed my name to this specification in the presence of two subscribing witnesses.

AARON E. ROLF.

Witnesses:
OLE BENSON,
J. H. McGILVRAY.